United States Patent
Huergo et al.

(10) Patent No.: US 12,041,925 B2
(45) Date of Patent: Jul. 23, 2024

(54) PROCEDURE FOR COLLECTION AND PROCESSING OF WEED SEEDS AND PRODUCT OBTAINED

(71) Applicants: Hector Augusto Huergo, Provincia de Buenos Aires (AR); Ana Fernandez Moujan, Provincia de Buenos Aires (AR)

(72) Inventors: Hector Augusto Huergo, Provincia de Buenos Aires (AR); Ana Fernandez Moujan, Provincia de Buenos Aires (AR)

( * ) Notice: Subject to any disclaimer, the term of this patent is extended or adjusted under 35 U.S.C. 154(b) by 975 days.

(21) Appl. No.: 16/531,174

(22) Filed: Aug. 5, 2019

(65) Prior Publication Data

US 2020/0068870 A1    Mar. 5, 2020

(30) Foreign Application Priority Data

Aug. 28, 2018    (AR) .............................. 20180102440

(51) Int. Cl.
| | |
|---|---|
| *A01M 21/02* | (2006.01) |
| *A01D 41/06* | (2006.01) |
| *A01F 12/00* | (2006.01) |
| *A01F 12/18* | (2006.01) |
| *A01F 12/30* | (2006.01) |
| *A01F 12/40* | (2006.01) |
| *A01F 12/44* | (2006.01) |

(Continued)

(52) U.S. Cl.
CPC ............. *A01M 21/02* (2013.01); *A01D 41/06* (2013.01); *A01F 12/00* (2013.01); *A01F 12/18* (2013.01); *A01F 12/30* (2013.01); *A01F 12/40* (2013.01); *A01F 12/44* (2013.01); *A01F 25/16* (2013.01); *A23K 40/20* (2016.05); *A23K 40/25* (2016.05); *A23K 50/10* (2016.05)

(58) Field of Classification Search
CPC .......... A01F 12/00; A01F 12/18; A01F 12/30; A01F 12/40; A01F 12/44; A01F 25/16; A01M 21/02; A23K 50/10; A23K 40/20; A23K 40/25; A01D 41/06
USPC ...... 460/14, 13, 63, 79, 97, 65; 56/14.6, 122
See application file for complete search history.

(56) References Cited

U.S. PATENT DOCUMENTS

| | | | |
|---|---|---|---|
| 5,873,226 A * | 2/1999 | McLeod ................ | A01D 41/00 56/122 |
| 2006/0185340 A1* | 8/2006 | Eyre ...................... | A01D 41/14 56/122 |

FOREIGN PATENT DOCUMENTS

WO    WO-2017210210 A1 *  12/2017  ............. A23K 10/30

* cited by examiner

*Primary Examiner* — Subbalakshmi Prakash
(74) *Attorney, Agent, or Firm* — Defillo & Associates, Inc.; Evelyn A. Defillo

(57) ABSTRACT

A procedure for collection and processing of weed seeds of the type which includes: a first step of collecting of a plant material; fourth step of threshing of the harvested material; a fifth step of separating of grains from material other than the grains; a sixth step of cleaning of the main material; a seventh step of transporting the main material to a discharge device; and an eighth step of storing the main material in an appropriate media. Also includes a second step of placing the material obtained by a thresher head assembly into at least one conveyor belt towards a trailer; a third step of transferring the plant material into a transport and hauling vehicle to a stationary processing plant; a ninth step of grinding the residues; a tenth step of introducing the MDG (Continued)

Figure 1:
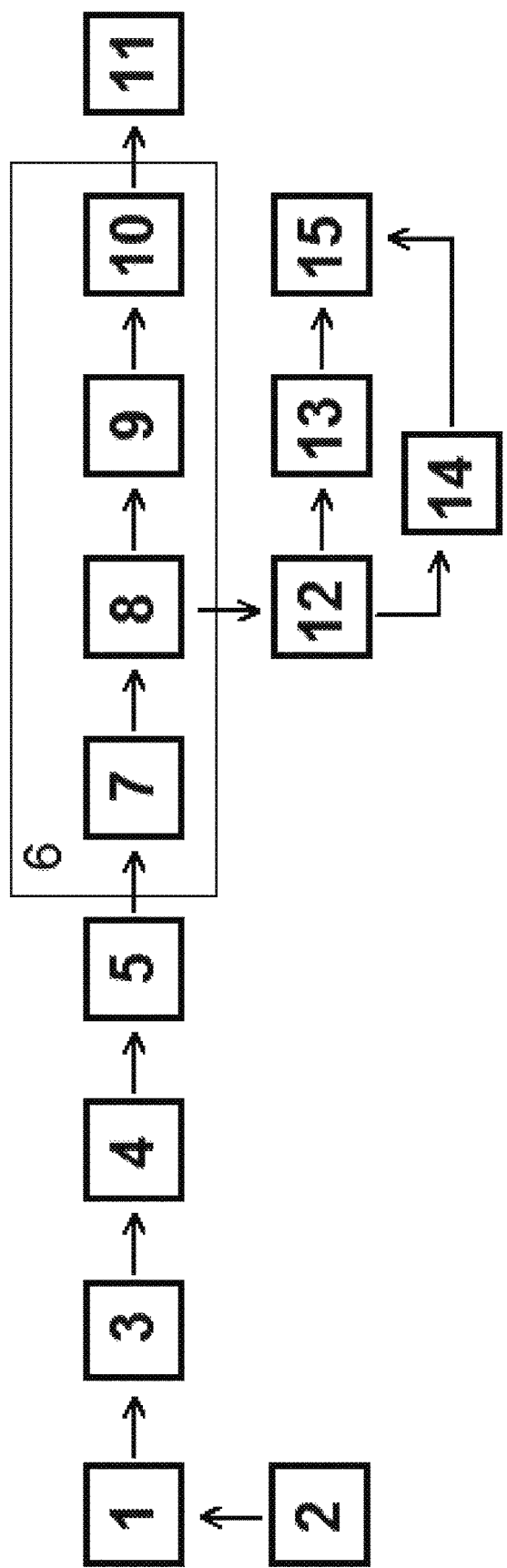

into densification device; and a tenth step of incorporating in a mixer the resulting grinding of the ninth step along with at least one supplement.

4 Claims, 2 Drawing Sheets

(51) Int. Cl.
*A01F 25/16* (2006.01)
*A23K 40/20* (2016.01)
*A23K 40/25* (2016.01)
*A23K 50/10* (2016.01)

PROCEDURE FOR COLLECTION AND PROCESSING OF WEED SEEDS AND PRODUCT OBTAINED

The present invention discloses a procedure for collecting and processing of weed seeds and the product obtained, that follows the below described guidelines and is illustrated with the accompanied figures, as a better way of understanding the revealed development, without that, such description and figures may be considered restrictive of the invention and rather a support for the study, understanding, and application.

PRIOR ART

Throughout history, the weeds have constituted one of the main problems of agricultural production, and many different methods have been used to try to combat them.

Originally, the procedure to fight against weeds consisted of manually pulling them out, method of which by the increase in the food requirements, by requiring a greater cultivated area, forced to dispose this method and replace it with mechanical procedures, which also had to be replaced by other more effective measures.

Thus, arrived the use of chemical, physical, and biological tools, taking enormous prominence on the use of chemicals herbicides, most recently linked with the advances in biotechnology.

Thanks to genetic modification, the use of old and very effective molecules, provided the crops with tolerance to these herbicides.

As derivation of this successful combination, it was feasible to extend new crop systems, such as the no till planting, which replaced the mechanical weed controls by the chemical control of them. The no till planting lowered the costs and reduced the soil erosion, allowing for a greater water accumulation in the profile, thus increasing the stability in the performance of the crops.

However, the massive use of a few molecules, particularly glyphosate, was causing a natural selection, which resulted in resistant weed to this product, affecting the agriculture in all countries of the world. The scientific community is dedicated to finding solutions which include the introduction of new molecules and other tools.

While such solutions are found, the focus is to prevent the spread of resistant or tolerant weeds.

The dispersion of the seeds of these weeds occurs by different mechanisms, which include the ones performed by the harvest machines.

Other sources are also the vector for the wind, as well as the one carried out by birds and other animals. To them, there are attributed the transfer of weed seeds from a field to another and even from one region to another.

Among the best practices is previous and thorough cleaning to the harvester admitted to collect a crop batch, a practice that has proven to be insufficient. Indeed, the main source of diffusion is the one that originates in emerged and germination inside a crop batch.

When weed seeds are taken up by the harvester during the collection process, they pass inside of the machine, which separates the different components and classifies them. The clean grains are transported to the tank or the hopper while the rest is discarded, falling to the crop batch.

Most of the harvesters have distribution mechanisms for the crop residues, so they are spread, if possible, to cover the same width of the cutting platform.

The drawback is that with such residues, there are also spreading of the weed seeds, which germinate accompanying the next crop.

The repetition of this process not only means the loss of growing crop, but also an accumulation of seeds in the soil, which generates what is known as a "seed bank".

For addressing this problem, an alternative emerges to set up a procedure to mechanically destroy the weed seeds during the harvesting process, which can be carried out once it has separated and stored the grain collected. Indeed, the threshing and conventional cleaning system allows to separate different phases of the residue, in one of which there are small size foreign materials, being where most of the weed seeds are located.

An application which mechanically destroys the seeds, includes a device which, linked to the harvester, collects the discarded material on a continuous basis and on the go.

The device was a power requirement of the order of 200 kwh, which required having its own source of energy.

The collected material was finely ground to be scattered on the field by the same machine. While the system aroused great interest, its high cost and big weight—in the order of 5200 kg—meant a limitation that failed to be overcome, thus, the inventor proposed it as a solution, incorporating the device to the harvester, using the same power source of the machine.

The solution contained numerous disadvantages, since as we have seen, their high-power consumption required additional power that was important for the harvester. In addition, it added complexity to an already excessive machine, having a loaded process and finally, the combined weight of both devices increased the soil compactation, one of the major problems of modern agriculture.

OBJECT

Result is a principal object of the proposed procedure to count with a series of steps that allow the weed seeds processing to achieve the destruction of the germinative capacity of the same.

Another object of the invention is to obtain high value biomass byproducts, resulting from such processing of weed seeds.

Another object of the present invention is to count the appropriate ways for the collection of weed seeds.

Another object of the present invention is to count the appropriate ways to carry forward the procedure of processing the weed seeds.

An object of the invention, which is described, is derived from the previously disclosed information to obtain economic benefit of a material which, so far, is discarded.

BRIEF DESCRIPTION OF THE INVENTION

As has been said, the described invention includes a procedure for collecting and processing weed seeds and the product obtained on which such collection includes a thresher head assembly also known as a stripper, a power group or tool carrier, at least one conveyor belt, a coupled, and transporting device.

It also includes a stationary processing plant comprising threshing devices, separation devices, and cleaning devices, as well as a main discharge material system.

The procedure provides a harvesting step; a transporting step; a transferring step; a threshing of the harvested material step; and a separating, and a cleaning step.

The procedure also includes a grinding of the separated material step; a thickening of the crushed material step; an added supplements step, and fractioning step.

FIGURES

The following schematic figures are included to allow a better understanding of the matter that is disclosed.

FIG. 1 shows a block diagram, including the different steps that form part of the described procedure.

Figure 2:
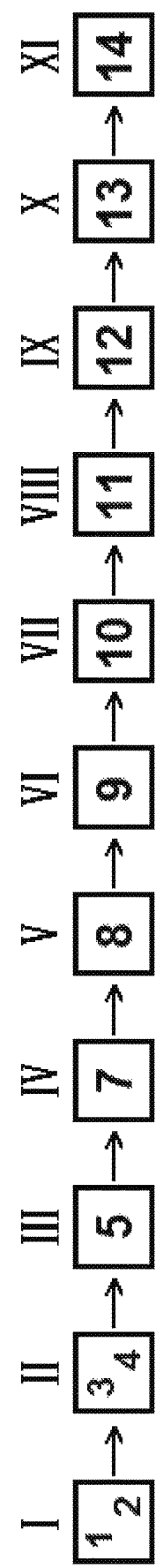

On the other hand, FIG. 2 shows a flow diagram showing the different steps that form part of the described procedure, including the references to the components that are involved in each of these steps.

REFERENCES

In described figures, the same characters represent the same or complementary parts.

This purpose reference number—1—indicates a thresher head assembly; reference number—2—indicates a power device; reference number—3—indicates a conveyor belt; reference number—4—indicates a coupling device, and reference number—5—indicates a transportation device.

Reference number—6—to indicate a stationary processing plant; reference number—7—indicates a threshing device; reference number—8—indicates a separation device; reference number—9—indicates a cleaning device, and reference number—10—indicates a discharge device.

Reference number—11—indicates an appropriate storage device; reference number—12—indicates a grinder; reference number—13—indicates a densification device; reference number—14—indicates a mixer device, and reference number—15—indicates a product.

Finally, the Roman numerals I to XI indicate the respective steps.

Each one of the blocks corresponding to a certain step was included in the reference numbers indicating the device is involved.

Operation

In order to obtain a procedure for collecting and processing weed seeds, and the obtained product, the use of different gadgets that are widely spread in the prior art are required.

Indeed, as it has been said before, the procedure begins with a first step of collecting a plant material for which is provided a thresher head assembly—1—also known as a stripper, which is powered from a power device—2—or tool carrier.

In a second step, the material obtained by a thresher head assembly (1) is placed into at least one conveyor belt—3—, which takes it to a trailer—4—from which, in a third step, is dumped into a transfer device—5—whose purpose is to carry the plant material to a stationary processing plant—6—where there is performed, the processing of the same.

This stationary processing plant (6) includes a threshing device—7—where in a fourth step includes the threshing of the harvested material and a separation device—8—where in a fifth step in which the grain is obtained in one side and on the order side the material is different from the grain (MDG), also known as MOG by the abbreviation in the English language (Materials Other than Grain). The stationary processing plant (6) also includes a cleaning device—9—where in a sixth step, the cleaning of the main material is performed, which then in a seventh step, is transported to a discharge device—10—from where, in an eighth step, is stored in an appropriate storage device—11—such as silos and silo bags.

In this first step, the proposed thresher head assembly (1), such as in the prior art, extracts the grains or ears as well as a percentage of the MDG, which include the weed seeds.

In the combined harvesters of the prior art, the harvested material is derived towards the feeder where it enters into the threshing and separation mechanisms. The grain is derived to deposits and residues among which are the weed seeds, that are scattered through the countryside.

In the second step of the procedure of the present invention, all of the harvested material is placed into at least one conveyor belt (3), avoiding the weed seeds falling in the crop batch.

Along with the weed seeds, there are crop residues such as pellets, cobs, leaves pieces, stems, and spikes, all of which can be recovered.

From the separation device (8) in the fifth step, the main material having grains and spikes passes, in the sixth step by the cleaning devices (9) and, in a seventh step, is poured into the discharge device (10), in an eighth step to be derived for storage.

For its part, in a ninth step, the waste or MDG are entered in a grinder—12—process during which the weed seeds lose their germination power, thus eliminating the risk of their dissemination by losses, during possible transfers or as a consequence of the excrement of the animals that ingest the product resulting from the grinding.

The preferred embodiment of the present invention, after the grinding in the ninth step, there is a tenth step, the MDG is introduced into a densification unit—13—where, according to final destination, will be further processed.

It may be necessary that cattle receive various supplements such as vitamins, medications, or dietary, in which case, in a tenth step, is proceeded to adding in a mixer—14—of the supplements selected together with the resultant grinding of the ninth step.

So, the final product—15—may include pellets, briquettes, or even undergo an extruding process.

With the described procedure is accomplished to remove from the cultivation batch a high percentage of weed seed favoring the future harvests. Moreover, as previously indicated, the production of pellets, briquettes, and extruding, is valued as an energy source or food of a product (15) that was discarded in the own batch affecting future crops or required as an investment to achieve its obtainment and subsequent discard.

The obtained product (15), with the described procedure, has a high fiber concentration, protein, energy, and microelements. The proportion, in which there are these components, depends on the type of cultivation, as well as the type of weeds.

Given that the different components involved in the described procedure require an important energy supply, the product (15) can be used for such purposes.

This way is described and illustrated as a preferred form of carrying out the invention, a procedure that supports variants which are not restrictive of the same.

In what follows is accompanied by a statement establishing the novel described invention; material that is claimed as exclusive property.

The invention claimed is:

1. A process for collecting and processing weed seeds, the process consisting of the following sequential steps:
   connecting a stripper device connected to a harvester, the stripper device is connected to a power device;
   collecting a plant material at a collection point by using the stripper device, the plant material includes grains, pellets, cobs, leaves pieces, stems, spikes, and weed seeds, the stripper device collects and discards plant material on a continuous basis into a conveyor belt;

wherein the conveyor belt is connected to a transportation device, and then the plant material is transport directly from the conveyor belt into a trailer without storing the plant material;

transferring the plant material directly from the trailer into a stationary processing plant located away from the collection point;

threshing the plant material in the stationary plant to produce a threshed material;

separating the threshed material into grains and the pellets, the cobs, the leaves pieces, the stems, the spikes, and the weed seeds;

cleaning the grains by using a threshing cleaning process to produce cleaned grains;

transporting the cleaned grains to a discharge device; and storing the cleaned grains in an appropriate media;

grinding the pellets, the cobs, the leaves pieces, the stems, the spikes, and the weed seeds to form a grinded material;

introducing the grinded material into a densification unit to form a densified material;

mixing in a mixer the densified material and at least one of vitamins, fibers, or proteins.

2. The procedure according to claim 1, wherein the appropriate media includes silos and silo bags.

3. A product obtained by the process of claim 1, wherein the product includes the densified material.

4. The product according to claim 3, wherein the product has a form of pellets, briquettes, or an extruded product.

* * * * *